United States Patent [19]

Yahagi et al.

[11] Patent Number: 5,109,694
[45] Date of Patent: May 5, 1992

[54] METHOD FOR ESTIMATING A REFERENCE VEHICLE SPEED OF A FOUR-WHEEL MOTOR VEHICLE

[75] Inventors: Toshio Yahagi; Yoshihiro Iwagawa; Yoichi Sugimoto; Tsuyoshi Satoh, all of Wako, Japan

[73] Assignee: Honda Giken Kogyo Kabushiki Kaisha, Corp., Tokyo, Japan

[21] Appl. No.: 648,330

[22] Filed: Jan. 30, 1991

Related U.S. Application Data

[63] Continuation-in-part of Ser. No. 381,422, Jul. 18, 1989, abandoned.

[30] Foreign Application Priority Data

Jul. 18, 1988 [JP] Japan .................. 63-178368

[51] Int. Cl.⁵ .......................................... G01M 15/00
[52] U.S. Cl. ......................................................... 73/9
[58] Field of Search ...................... 73/118.1, 9; 364/426.02; 303/109

[56] References Cited

U.S. PATENT DOCUMENTS

| | | | |
|---|---|---|---|
| 3,930,688 | 1/1976 | Rau et al. | 364/426.02 |
| 4,042,059 | 8/1977 | Bertolasi | 180/103 |
| 4,322,809 | 3/1982 | De Vlieg et al. | 303/109 |
| 4,526,426 | 7/1985 | Sato et al. | 303/6 |
| 4,877,295 | 10/1989 | Yoshino | 303/109 |

FOREIGN PATENT DOCUMENTS

| | | |
|---|---|---|
| 2340575 | 7/1980 | Fed. Rep. of Germany . |
| 3637722A1 | 5/1987 | Fed. Rep. of Germany . |
| 989119 | 4/1965 | United Kingdom . |
| 2004012 | 3/1979 | United Kingdom . |
| 2194825 | 3/1988 | United Kingdom . |

Primary Examiner—Robert Raevis
Attorney, Agent, or Firm—Armstrong & Kubovcik

[57] ABSTRACT

The present invention relates to a method for estimating vehicle speeds independently on front and rear wheels of a four-wheel motor vehicle on the basis of front wheel speeds and rear wheel speeds, for use as a basis for determining slip rates for front and rear wheels. According to the first method of the invention, a reference wheel speed determined by the vehicle speed as estimated from the left and right wheel speeds cannot be unnecessarily increased during turning of the vehicle. According to the second and third methods of the invention, the estimated vehicle speed largely does not deviate from the actual vehicle speed in the event of a phase difference of variants produced between the left and right wheels due to an anti-lock control during the turning of the vehicle. According to other features of the invention, corrections can be performed with respect to the inner and outer wheel differences during turning of the vehicle based on an index representative of the traveling speed, lateral acceleration of the vehicle and steering angle.

5 Claims, 5 Drawing Sheets

METHOD FOR ESTIMATING A REFERENCE VEHICLE SPEED OF A FOUR-WHEEL MOTOR VEHICLE

This application is a continuation-in-part of application Ser. No. 381,422 filed Jul. 18, 1989, now abandoned.

BACKGROUND OF THE INVENTION

The present invention is directed to a method for estimating a vehicle speed of a four-wheel motor vehicle for determining slip rates of front and rear wheels in an anti-lock brake system, and more particularly to a method wherein a vehicle speed is estimated independently on front wheel side and rear wheel side on the basis of front wheel speeds, respectively and rear wheel speeds.

In order to effect an anti-lock control for brakes mounted on front wheels and rear wheels, it is a conventional practice to estimate a vehicle speed required for an anti-lock control of the front wheel brakes on the basis of front wheel speeds and estimate a vehicle speed required for an anti-lock control of the rear wheel brakes on the basis of rear wheel speeds. A slip rate is determined by comparison of reference wheel speeds determined by these estimated vehicle speeds with the wheel speeds for the anti-lock control. Such estimating methods are known, for example, from Japanese Patent Application Laid-open Nos. 41237/82 and 60948/82.

When a vehicle equipped with an anti-lock control brake device is braked during travel on a straight road, the highest wheel speed of the four wheels is a value nearest to the vehicle speed whether the brake device is or is not under an anti-lock control. Thereupon, if a vehicle speed on the front wheels is estimated on the basis of a high select value of the front wheel speeds and a vehicle speed on the rear wheels is estimated on the basis of a high select value of the rear wheel speeds, such estimated vehicle speeds can approximate to the actual vehicle speed when the vehicle is braked during travel on a straight road. When the vehicle is braked during turning thereof, however, a large difference is produced between the highest one of the four wheel speeds and any other wheel speed due to inner and outer wheel speed differences of the left and right wheels. For this reason, if a vehicle speed is estimated on the basis of a high select value as described above, anti-lock control may be performed unnecessarily due to a determination of excessive slip having been produced since a reference wheel speed that indicates a slip rate is determined by the estimated vehicle speed.

SUMMARY OF THE INVENTION

It is an object of the present invention to provide a method for estimating a vehicle speed of a four-wheel vehicle, wherein a vehicle speed can be substantially and accurately estimated during turning of the vehicle.

In a first method for estimating a vehicle speed of a four-wheel motor vehicle, by estimation of the vehicle speed independently of the front and rear wheels based on the front wheel speeds and rear wheel speeds for determining the slip rates of the front and rear wheels, the present invention comprises estimating a vehicle speed for the front wheels on the basis of a low select value of front wheel speeds, and estimating a vehicle speed for the rear wheels on the basis of a low select value of rear wheel speeds.

In a second method for estimating a vehicle speed of a four-wheel motor vehicle, by estimation of the vehicle speed independently of the front and rear wheels based on the front wheel speeds and rear wheel speeds for determining the slip rates of the front and rear wheels, the present invention comprises estimating the vehicle speeds on the front wheels based on a high select value selected from two values: a low select value of the speeds of the front wheels and a value resulting from correction of a high select value of wheel speeds of the front and rear wheels with respect to inner and outer wheel speed differences during turning of the vehicle. The second method of the present invention also comprises estimating the vehicle speed on the rear wheels based on a high select value selected from two values: a low select value of rear wheel speeds and a value resulting from the correction of a high select value of wheel speeds of the front and rear wheels with respect to inner and outer wheel speed differences during turning of the vehicle.

In a third method for estimating a vehicle speed of a four-wheel motor vehicle, by estimation of the vehicle speed independently of the follower wheels and on the substantially rigidly connected left and right drive wheels based on their wheel speeds for determining the slip rates of the follower wheels as well as the drive wheels, the present invention comprises estimating a vehicle speed on the drive wheels based on a high select value selected from two values: a value resulting from the correction of the highest of a low select value of the drive wheel speeds and a high select value of the follower wheel speeds and respect to inner and outer wheel differences during turning of the vehicle; and a low select value of the drive wheel speeds. The third method of the present invention also comprises estimating a vehicle speed on the follower wheels on the basis of a high select value selected from two values: the value resulting from the correction of the highest of a lower select value of the drive wheel speeds and a high select value of the follower wheel speeds with respect to inner and outer wheel differences during turning of the vehicle; and a low select value of the follower wheel speeds.

A further feature of the present invention is on the basis of the fact that a minimum radius of turning of the vehicle is determined by the traveling speed of the vehicle. A correction is carried out with respect to the inner and outer wheel speed differences during turning of the vehicle by use of a correcting value set depending upon an index representative of the traveling speed.

Another feature of the present invention resides in that correction is carried out with respect to the inner and outer wheel speed differences during the turning of the vehicle by use of a correcting value set depending upon a lateral acceleration of the vehicle and an index representative of the traveling speed of the vehicle Still another feature of the present invention resides in that a correction is carried out with respect to the inner and outer wheel speed differences during the turning of the vehicle by use of a correcting value set dependent upon the steering angle.

According to the above first embodiment, a vehicle speed is estimated on the basis of a low select value of the left and right wheel speeds. Therefore, a reference wheel speed determined by the estimated vehicle speed is not unnecessarily increased during turning of the vehicle.

According to the above second embodiment, vehicle speeds of the front wheels and of the rear wheels are estimated, respectively, on the basis of the higher one of two values: a value resulting from the correction of a high select value of the four-wheel speeds with respect to inner and outer wheel speed differences and a low select value of the left and right wheel speeds. Hence, a phenomenon that the estimated vehicle speed deviates substantially from the actual vehicle speed, which may occur when the vehicle speed is estimated only on the basis of such a low select value like the first embodiment, in the event of a phase difference or variance produced between the left and right wheels due to an anti-lock control during turning of the vehicle, can be avoided.

According to the third embodiment, vehicle speeds on the drive and follower wheels are estimated, respectively, on the basis of the higher selected value between two values: a value resulting from the correction of a high select value between the lower select values of the drive wheel speeds and the high select values of the follower wheel speeds with respect to the inner and outer wheel speed differences; and a low select value of the drive or follower wheel speeds. However, when the left and right drive wheels are substantially and rigidly connected, the wheel speeds of the left and right drive wheels are substantially synchronous. Thus, a phase variance cannot be produced between the left and right drive wheels due to the anti-lock control during the turning of the vehicle. Even if a low select value of the drive wheel speeds is taken, as in the third embodiment, the estimated vehicle speed does not deviate substantially from the actual vehicle speed.

Finally, according to the further features, the correction can be performed with respect to the inner and outer wheel differences during turning of the vehicle.

BRIEF DESCRIPTION OF THE DRAWINGS

FIG. 2 to 5 illustrate a second embodiment of the present invention, wherein

FIG. 2 is an entire block diagram;

FIG. 3 and 4 are graphs illustrating correcting-value setting characteristics during turning of the vehicle; and FIG. 5 is a graph illustrating one example of wheel speed characteristics during independent left and right side anti-lock controls.

DETAILED DESCRIPTION OF THE PREFERRED EMBODIMENTS

Figure 1:
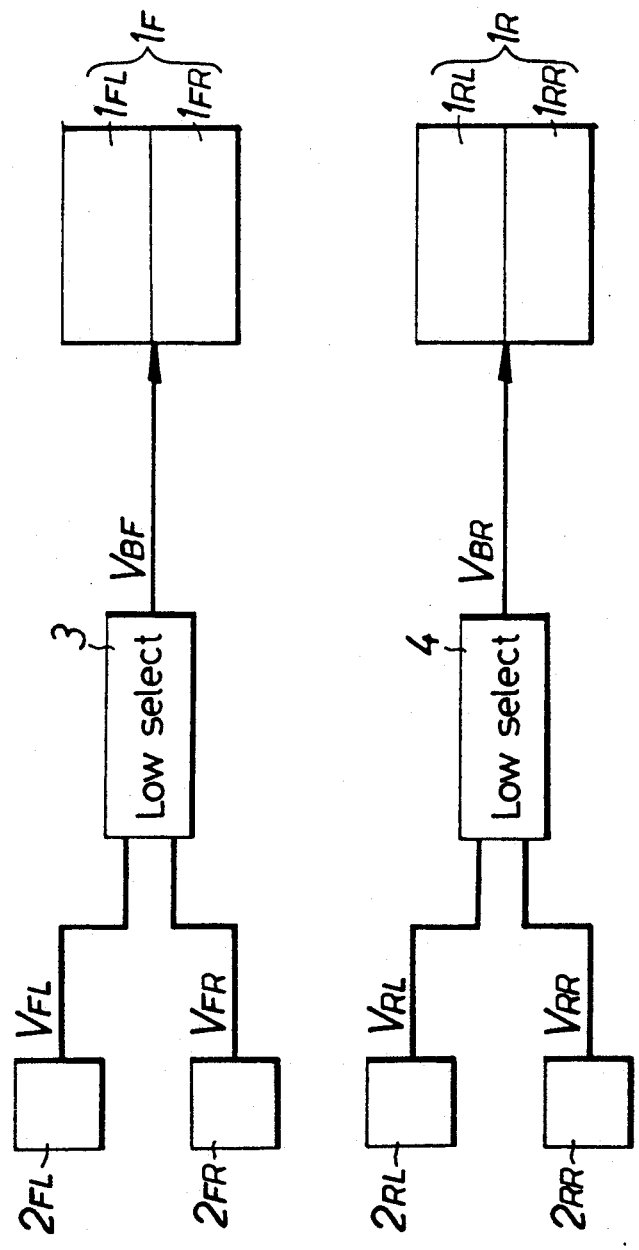
FIG. 1 is an entire block diagram illustrating a first embodiment of the present invention.

Referring to FIG. 1, the hydraulic braking pressure of front wheel brakes mounted respectively on the front wheels of a vehicle is controlled by an anti-lock control circuit $1_F$ when the corresponding wheel is about to become locked. The hydraulic braking pressure of rear wheel brakes mounted respectively on the rear wheels of a vehicle is controlled by an anti-lock control circuit $1_R$ when the corresponding wheel is about to become locked. Each of the anti-lock control circuits $1_F$ and $1_R$ comprises control sections $1_{FL}$ and $1_{FR}$, and $1_{RL}$ and $1_{RR}$, respectively, independently associated with the corresponding left or right wheel. In these control sections $1_{FL}$, $1_{FR}$, $1_{RL}$ and $1_{RR}$, when the speed of the corresponding wheel has become lower than a reference wheel speed, it is decided that a slip rate has exceeded an allowable value, thereby starting an anti-lock control for the corresponding wheel brake.

The above reference wheel speed is determined based on the vehicle speed and a given slip rate. A vehicle speed on the front wheel side is estimated on the basis of the front wheel speeds in the anti-lock control circuit $1_F$, and a vehicle speed on the rear wheel side is estimated on the basis of the rear wheel speeds in the anti-lock control circuit $1_R$.

For such an estimation of the vehicle speeds, speed sensors $2_{FL}$ and $2_{FR}$ are mounted on the front wheels, while speed sensors $2_{RL}$ and $2_{RR}$ are mounted on the rear wheels. Front wheel speeds obtained in the speed sensors $2_{FL}$ and $2_{FR}$ are inputted into a low select circuit 3, while rear wheel speeds obtained in the speed sensors $2_{RL}$ and $2_{RR}$ are inputted into a low select circuit 4.

In the low select circuit 3, the lower of the wheel speeds $V_{FL}$ and $V_{FR}$ inputted is selected as a reference vehicle speed $V_{BF}$ of the front wheels, and in the low select circuit 4, the lower of the rear wheel speeds $V_{FL}$ and $V_{RR}$ inputted is selected as a reference vehicle speed $V_{BR}$ of the rear wheels. The reference vehicle speeds $V_{BF}$ and $V_{BR}$ selected in the low select circuits 3 and 4 are inputted into the corresponding anti-lock control circuits $1_F$ and $1_R$, respectively.

The operation of this embodiment will be described below. The lower of the front wheel speeds $V_{FL}$ and $V_{FR}$ is selected as a reference vehicle speed $V_{BF}$ of the front wheels and inputted into the anti-lock control circuit $1_F$, and the lower of the rear wheel speeds $V_{RL}$ and $V_{RR}$ is selected as an estimated a reference vehicle speed $V_{BR}$ of the rear wheels and inputted into the anti-lock control circuit $1_R$. During braking in the course of turning of the vehicle, the reference wheel speed based on the vehicle speed should not be set too high. As a result, the slip rate of each wheel cannot be estimated to be unnecessarily high due to inner and outer wheel differences. Thus, unnecessary anti-lock control is avoided.

It should be noted that if the vehicle speed is intended to be estimated on the basis of a low select value between the left and right wheel speeds as in the above embodiment, then the estimated vehicle speed may be very different from the actual vehicle speed in some cases due to a phase difference between the left and right wheels when the anti-lock control for each of the left and right wheels is independently performed. Thereupon, a description will now be made of an embodiment in which the vehicle speed nearer to an actual vehicle speed can be estimated even if there is a phase difference between the left and right wheels.

FIGS. 2 to 5 illustrate a second embodiment of the invention, wherein portions corresponding to those in the previously-described embodiment shown in FIG. 1 are designated by the same reference characters.

Front wheel speeds $V_{FL}$ and $V_{FR}$ obtained in the speed sensors $2_{FL}$ and $2_{FR}$ are inputted into the low select circuit 3 and also into a high select circuit 5, while rear wheel speeds $V_{RL}$ and $V_{RR}$ obtained in the speed sensors $2_{RL}$ and $2_{RR}$ are inputted into the low select circuit 4 and also into a high select circuit 6. The high select circuits 5 and 6 are connected to a high select circuit 7. The highest wheel speed $V_H$ among the speeds of the four wheels of the vehicle is selected in the high select circuit 7.

The wheel speed $V_H$ selected in the high select circuit 7 is inputted into correction circuits 8 and 9 and also into setting circuits 10 and 11. The correction circuits 8 and 9 correct the wheel speed $V_H$ on the basis of inner and outer wheel differences during turning of the vehicle. In the correction circuit 8, a calculation according to Equation (1) is effected, and in the correction circuit 9, a calculation according to Equation (2) is effected.

$$V_{HF} = V_H - \Delta V_F \quad (1)$$

$$V_{HR} = V_H - \Delta V_R \quad (2)$$

Figure 3:
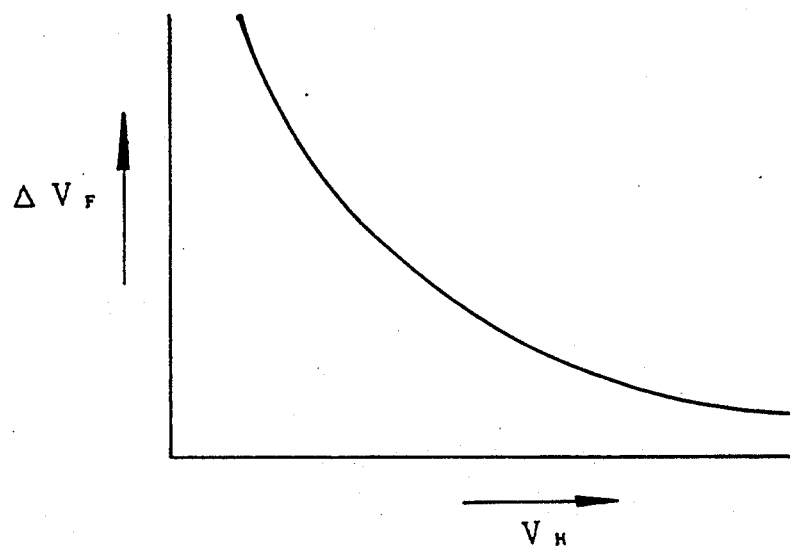
Figure 4:
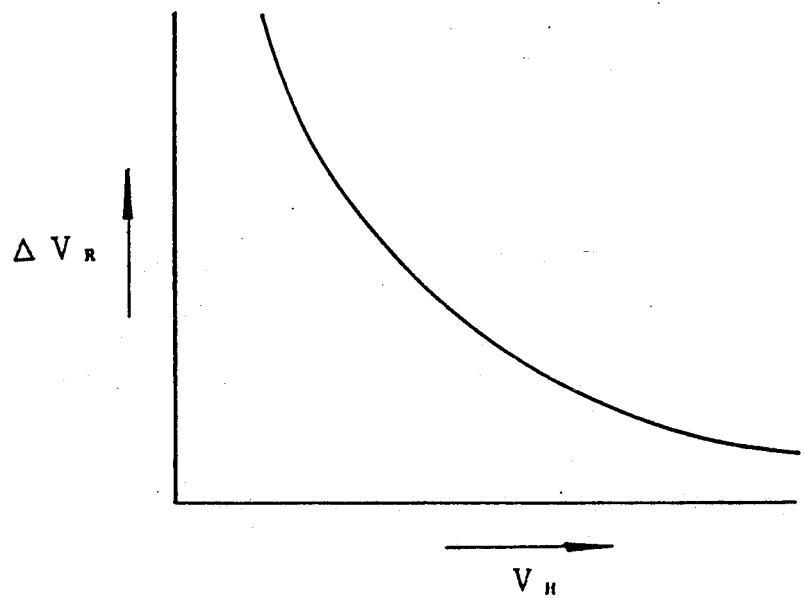

$\Delta V_F$ and $\Delta V_R$ in the equations (1) an (2) are each a correcting value for providing a correction with respect to the inner and outer wheel differences during turning of the vehicle. These correcting values are delivered from the setting circuits 10 and 11 into the correction circuits 8 and 9. On the basis of the fact that a minimum radius of turning of the vehicle is determined by the travelling speed of the vehicle, the correcting value $\Delta V_F$ has been set in the setting circuit 10 as shown in FIG. 3 in accordance with an index representative of the vehicle travelling speed (e.g., the wheel speed $V_H$) and the correcting value $\Delta V_R$ has been set in the setting circuit as shown in FIG. 4 in accordance with the wheel speed $V_H$.

The wheel speed $V_{LF}$ obtained in the low select circuit 3 and the wheel speed $V_{HF}$ obtained in the correction circuit 8 are supplied to the high select circuit 12, while speed $V_{LR}$ obtained in the low select circuit 4 and the wheel speed $V_{HR}$ obtained in the correction circuit 9 are supplied to the high select circuit 13. In the high select circuit 12, the higher of the wheel speeds $V_{LF}$ and $V_{HF}$ is selected as the reference vehicle speed $V_{BF}$ on the front wheels which is then applied to the anti-lock control circuit $1_F$. On the other hand, in the high select circuit 13, the higher of the wheel speeds $V_{LR}$ and $V_{HR}$ is selected as the reference vehicle speed $V_{ER}$ on the rear wheels which is then applied to the anti-lock control circuit $1_R$.

The operation of this embodiment will be described below. A reference vehicle speed $V_{BF}$ of the front wheels is estimated on the basis of a high select value selected from two values: the lower select value $V_{LF}$ of the wheels speeds $V_{FL}$ and $V_{FR}$ and a value $V_{HF}$ resulting from the correction of the high select value $V_H$ of the front and rear four-wheel speeds with respect to the inner and outer wheel differences during turning of the reference vehicle. A vehicle speed $V_{BR}$ of the rear wheels is estimated on the basis of a high select value selected from two values: the lower select value $V_{LR}$ of the wheel speeds $V_{RL}$ and $V_{RR}$ and a value $V_{HR}$ resulting from the correction of the high select value $V_H$ of the front and rear four-wheel speeds with respect to the inner and outer wheel speed differences during turning of the vehicle. By comparison of a reference wheel speed determined by each of these reference vehicle speeds $V_{BF}$ and $V_{BR}$ with the individual wheel speeds, a slip rate is determined to effect an anti-lock control.

Figure 5:
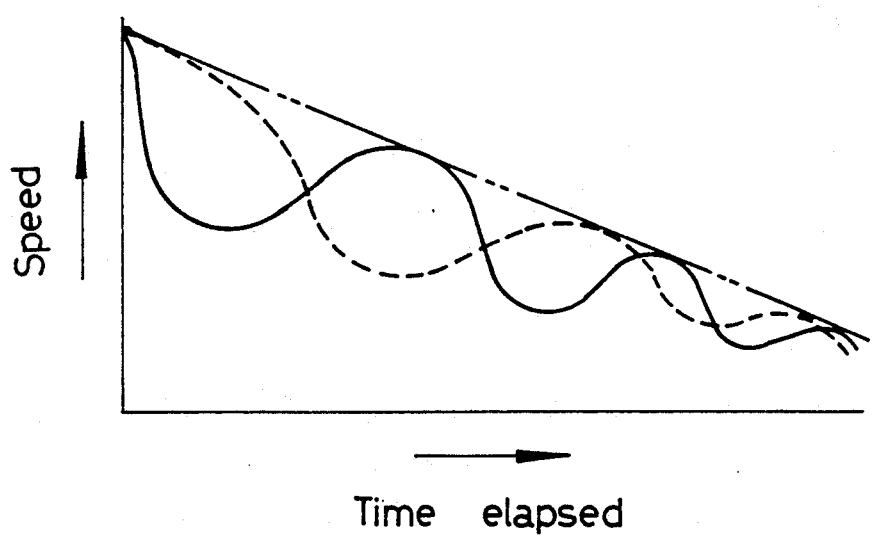

Therefore, when a phase difference is produced between the left and right wheels as indicated by broken line and a solid line in FIG. 5 as result of the left and right side independent anti-lock controls at braking during turning of the vehicle, a vehicle speed very different from the actual vehicle speed is estimated if it is derived from the low selection as in the embodiment shown in FIG. 1, whereas an estimated vehicle speed nearer the actual vehicle speed can be obtained on the basis of a high select value as an estimated vehicle speed selected from two values: a low select value of either the front or rear speed; and a value resulting from correction of the corresponding high select value of the four wheel speeds with respect to the inner and outer wheel differences.

Figure 2:
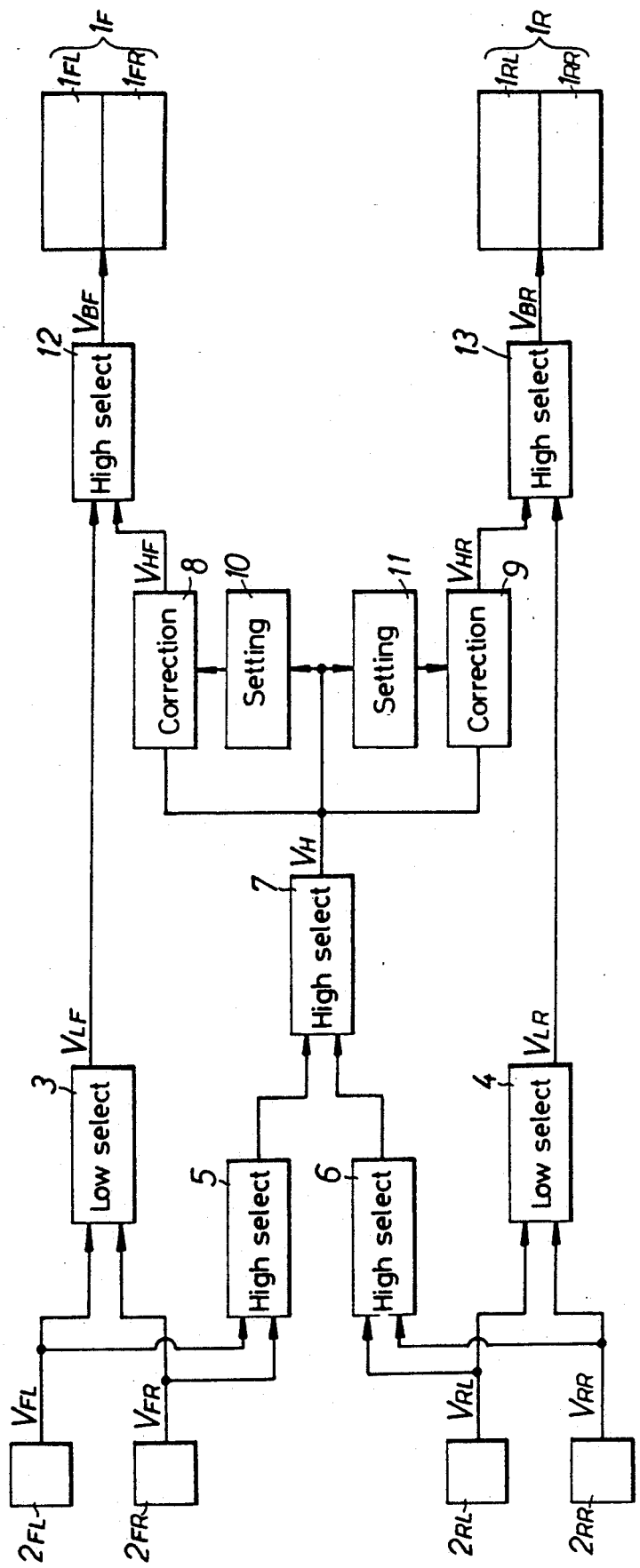

In an alternate embodiment of the present invention, a lateral acceleration of the vehicle may be detected, and the lateral acceleration and a wheel speed $V_H$ representative of a traveling speed may be inputted into the setting circuits 10 and 11 shown in FIG. 2. Correcting values $\Delta V_F$ and $\Delta V_R$ are thereby determined from the lateral acceleration and the wheel speed $V_H$. Alternatively, a steering amount may be detected and correcting values $\Delta V_F$ and $\Delta V_R$ may be determined depending upon that steering amount.

Figure 6:
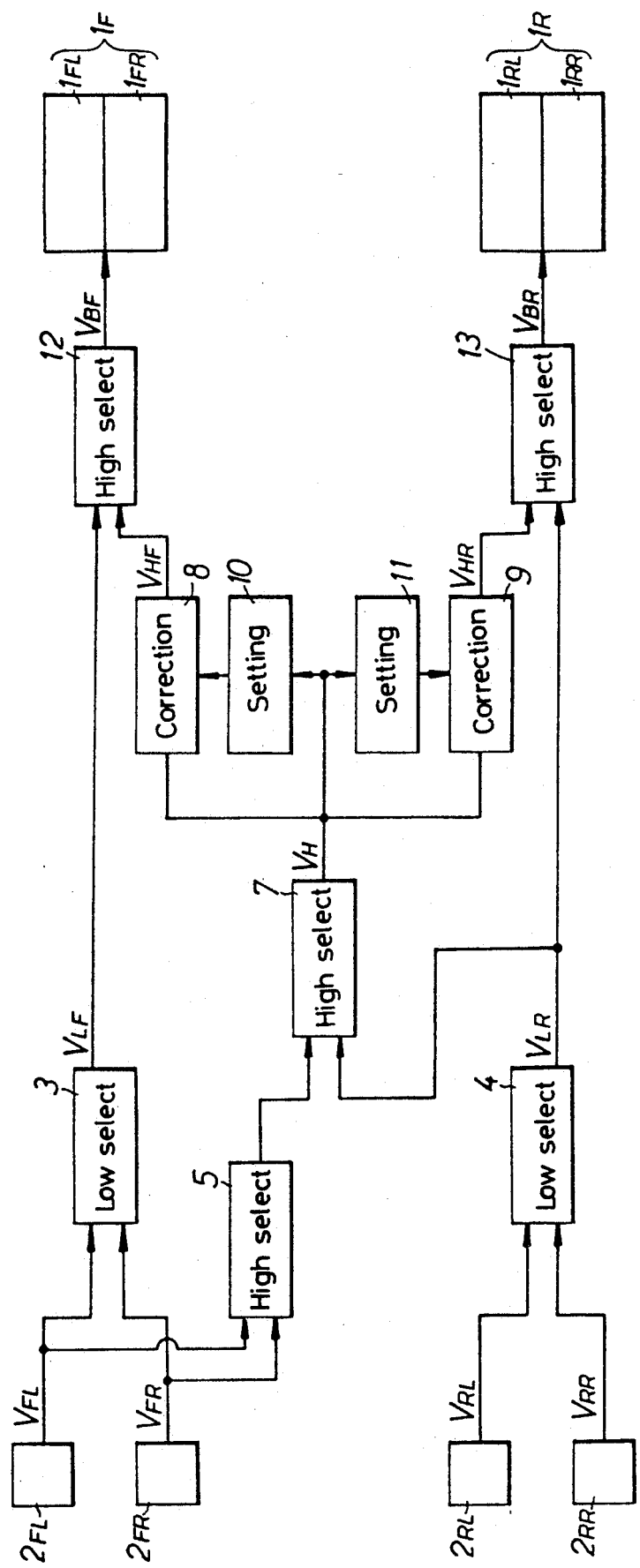
FIG. 6 is an entire block diagram of a third embodiment of the present invention.

FIG. 6 shows a third embodiment of the present invention, wherein portions corresponding to those in the previous embodiments are designated by the same reference characters.

In the embodiment shown in FIG. 6, left and right rear wheels, which are drive wheels, are substantially rigidly connected, for example, by a viscous coupling and this embodiment is very similar to the embodiment shown in FIG. 2. It should be noted that rear wheel speeds $V_{RL}$ and $V_{RR}$ obtained in the speed sensors $2_{RL}$ and $2_{RR}$ are inputted into the low select circuit 4, and a low select value $V_{LR}$ obtained in the low select circuit 4 is inputted into the high select circuit 7 and also into the high select circuit 13. Other portions are arranged in the same manner as in FIG. 2.

When the rear wheels as left and right drive wheels are substantially rigidly connected in such a manner, the speeds $V_{RL}$ and $V_{Rr}$ of the left and right rear wheels are substantially equal. Hence, even if either a high select value or low select value of these speeds $V_{RL}$ and $V_{RR}$ is taken, there is not a substantial difference. Accordingly, the embodiment shown in FIG. 6 has basically the same construction as that of the embodiment shown in FIG. 2 and can provide an effect similar to that provided by the embodiment shown in FIG. 2.

As discussed above, according to the first embodiment of the present invention, a vehicle speed on the front wheels is estimated on the basis of a low select value of the front wheel speeds, and a vehicle speed on the rear wheels is estimated on the basis of a low select value of the rear wheel speeds. Thus, this avoids the estimated vehicle speed being so high during turning of the vehicle that a slip rate is too often detected. This makes it possible to prevent an unnecessary anti-lock control from being effected.

According to the second embodiment of the present invention, a vehicle speed on the front wheels is estimated on the basis of a high select value selected from two values: a low select value of front wheel speeds; and a value resulting from correction of a high select value of wheel speeds of four front and rear wheels with respect to inner and outer wheel differences during turning of the vehicle. A vehicle speed on the rear wheels is estimated on the basis of a high select value selected from two values: a low select value of rear wheel speeds; and a value resulting from correction of a high select value of wheel speeds of four front and rear wheels with respect to inner and outer wheel differences during turning of the vehicle. Therefore, it is possible to preclude the estimating of the vehicle speed using a low selection value that may be very different from an actual vehicle speed during anti-lock control in the course of turning of the vehicle, and to thus provide an estimated vehicle speed closer to the actual vehicle speed.

According to the third embodiment of the present invention, a vehicle speed on the drive wheels is estimated on the basis of a high select value selected from two values: a value resulting from correction of the higher value between a lower select value of the drive wheel speeds and a high select value of the follower wheel speeds with respect to inner and outer wheel differences during turning of the vehicle; and a low select value of the drive wheel speeds. A vehicle speed on the follower wheels is estimated on the basis of a high select value selected from two values: a value resulting from correction of the higher value between a low select value of the drive wheel speeds and a high select value of the follower wheels with respect to inner and outer wheel differences during turning of the vehicle; and a low select value of the follower wheel speeds. Therefore, it is possible to provide an effect similar to that of the above second feature by utilizing the fact that the drive wheel speeds are substantially the same when the drive wheels are substantially rigidly connected.

Further, according to the fourth, fifth and sixth embodiments, the correction is effected with respect to the inner and outer differences by use of a correcting value set depending upon an index representative of a travelling speed which affects the minimum radius of turning of the vehicle, or a correcting value set depending upon the lateral acceleration of the vehicle and an index representative of the travelling speed of the vehicle, or a correcting value set depending upon the steering angle. Therefore, it is possible to provide proper correction with respect to the inner and outer wheel differences during turning of the vehicle.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and rang of equivalency of the claims are, therefore, to be embraced therein.

What is claimed is:

1. A method of estimating vehicle speeds independently on front wheels and rear wheels of a four-wheel motor vehicle for determining slip rates of the front and rear wheels for use in anti-lock brake control, comprising the steps of:
    (a) determining the speed of each of the front wheels;
    (b) selecting the lowest of the front wheel speeds as a reference vehicle speed for the front wheels;
    (c) determining a vehicle speed on the front wheel side based on the reference vehicle speed for the front wheels wherein the vehicle speed on the front wheel side is used for determining the slip rate of the front wheels;
    (d) determining the speed of each of the rear wheels;
    (e) selecting the lowest of the rear wheel speeds as a reference vehicle speed for the rear wheels; and
    (f) determining a vehicle speed on the rear wheel side based on the reference vehicle speed for the rear wheels wherein the vehicle speed on the rear wheel side is used for determining the slip rate of the rear wheels.

2. A method of estimating vehicle speeds independently on the front wheels and rear wheels of a four-wheel motor vehicle for determining slip rates of the front and rear wheels for use in anti-lock brake control, comprising the steps of:
    (a) determining the speed of each of the front wheels;
    (b) determining the speed of each of the rear wheels;
    (c) selecting the lowest of the front wheel speeds;
    (d) selecting the highest of the front and rear wheel speeds;
    (e) determining a first value based on the highest value of the wheel speeds and a first correction factor for the inner and outer wheel speed differences due to the turning of the vehicle;
    (f) determining a reference vehicle speed for the front wheels by high selection from the lowest of the front wheel speeds and the first value;
    (g) determining a vehicle speed for the front wheels based on the reference vehicle speed for the front wheels wherein the vehicle speed is used for determining the slip rate of the front wheels;
    (h) selecting the lowest of the rear wheel speeds;
    (i) determining a second value based on the highest value of the front and rear wheel speeds and a second correction factor for the inner and outer wheel speed differences due to the turning of the vehicle;
    (j) determining a reference vehicle speed for the rear wheels by high selection by high selection from the lowest of the rear wheel speeds and the second value; and
    (k) determining a vehicle speed for the rear wheels based on the reference vehicle speed for the rear wheels wherein the vehicle speed is used for determining the slip rate of the rear wheels.

3. A method according to claim 2, wherein
the first and second correction factors are based on an index representative of the traveling speed of the vehicle.

4. A method according to claim 2, wherein
the first and second correction factors are based on a lateral acceleration of the vehicle and an index representative of the traveling speed of the vehicle.

5. A method according to claim 2, wherein
the first and second correction factors are based on a steering angle of the vehicle.

* * * * *